US010519560B2

(12) United States Patent
Opalka et al.

(10) Patent No.: US 10,519,560 B2
(45) Date of Patent: Dec. 31, 2019

(54) PROCESS FOR MAKING UNIFORM ALUMINUM OXIDE COATING

(71) Applicant: Hamilton Sundstrand Corporation, Charlotte, NC (US)

(72) Inventors: Susanne M. Opalka, Glastonbury, CT (US); Mark R. Jaworowski, Glastonbury, CT (US); Georgios S. Zafiris, Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 221 days.

(21) Appl. No.: 15/587,941

(22) Filed: May 5, 2017

(65) Prior Publication Data

US 2018/0320284 A1 Nov. 8, 2018

(51) Int. Cl.
*C25D 13/02* (2006.01)
*C25D 13/22* (2006.01)
*C25D 9/12* (2006.01)
*C01F 7/00* (2006.01)
*C01F 7/34* (2006.01)
*C01F 7/36* (2006.01)
*C09D 1/00* (2006.01)
*C09D 5/08* (2006.01)
*C25D 5/50* (2006.01)

(52) U.S. Cl.
CPC ............. *C25D 9/12* (2013.01); *C01F 7/00* (2013.01); *C01F 7/34* (2013.01); *C01F 7/36* (2013.01); *C09D 1/00* (2013.01); *C09D 5/084* (2013.01); *C25D 5/50* (2013.01); *C25D 13/02* (2013.01); *C25D 13/22* (2013.01)

(58) Field of Classification Search
CPC ..................................................... C25D 13/02
See application file for complete search history.

(56) References Cited

U.S. PATENT DOCUMENTS

| 3,947,340 | A | 3/1976 | Kawagoshi et al. |
| 3,976,554 | A | 8/1976 | Powers et al. |
| 6,841,497 | B1 | 1/2005 | Krell et al. |
| 8,007,759 | B2 | 8/2011 | Deschaume et al. |
| 9,340,678 | B2 | 5/2016 | Keszler et al. |

(Continued)

FOREIGN PATENT DOCUMENTS

| CN | 104556182 A | 4/2015 |
| DE | 1905896 A1 | 10/1970 |

(Continued)

OTHER PUBLICATIONS

Zhang et al., "Cost-Effective Production of Pure Al 13 from AlCl 3 by Electrolysis," I & EC Research, vol. 51, No. 34; Aug. 17, 2012.

(Continued)

*Primary Examiner* — Brian W Cohen
(74) *Attorney, Agent, or Firm* — Kinney & Lange, P.A.

(57) ABSTRACT

A process of making a dense, cohesive and uniform aluminum oxide coating on a metallic substrate includes electrodepositing polynuclear aluminum oxide hydroxide clusters from a polynuclear aluminum oxide hydroxide cluster solution on a metallic substrate to form a precursor coating, and post-treating the precursor coating to form a final aluminum oxide coating on the metallic substrate.

14 Claims, 2 Drawing Sheets

(56) References Cited

U.S. PATENT DOCUMENTS

2009/0314284 A1* 12/2009 Schultz .................. B82Y 30/00
                                                          126/710
2013/0084672 A1*  4/2013 Keszler ............ H01L 31/02168
                                                          438/72

FOREIGN PATENT DOCUMENTS

EP          1204597 A2    5/2002
WO     WO2017026461 A1    2/2017

OTHER PUBLICATIONS

Extended European Search Report for EP Application No. 18170642.5, dated Sep. 26, 2018, 8 pages.
Communication Pursuant to Article 94(3) EPC for EP Application No. 18170642.5, dated Sep. 9, 2019, pp. 5.
Oh et al. "Effects of Alloying Elements on Microstructure and Protective Properties of Al2O3 Coatings formed on Aluminum Alloy Substrates by Plasma Electrolysis," Jul. 9, 2009, Surface & Coatings Technology, pp. 141-148 (Year: 2009).
Shi-Gang et al., "Properties of Aluminum Oxide Coating on Aluminum Alloy Produced by Micro-Arc Oxidation," Feb. 12, 2005, Surface & Coatings Technology, pp. 184-188 (Year: 2005).

* cited by examiner

PROCESS FOR MAKING UNIFORM ALUMINUM OXIDE COATING

BACKGROUND

The application relates generally to protection and anti-corrosion coatings on metallic substrates, and specifically to the formation of aluminum oxide coatings on metallic substrates.

The established methods for passivating metallic substrates include conversion coatings and anodizing processes, among other methods. In general, these processes involve the reaction of metal alloy component surfaces with chemical baths to form reaction product layers. Because the quality and integrity of these passivation layers are dependent on the composition and uniformity of the reacting surfaces, these processes can generally only be used on specific types of metallic substrates. Additionally, these processes involve multiple, intensive steps, including cleaning, rinses, and post-sealing treatments, that consume a large amount of water throughout the process, generate hazardous waste and sludge, and deposit a thick, non-uniform layer on the substrate. Many of these processes also require additional deposition of a protective organic coating layer for optimal corrosion resistance.

SUMMARY

A method includes electrodepositing polynuclear aluminum oxide hydroxide clusters from a polynuclear aluminum oxide hydroxide cluster solution on a metallic substrate to form a precursor coating and post-treating the precursor coating to form an aluminum oxide coating on the metallic substrate.

A protective coating on a metallic substrate includes a dense, cohesive aluminum oxide layer formed from electrodeposited, heat-treated polynuclear aluminum oxide hydroxide clusters.

DETAILED DESCRIPTION

A strong anti-corrosion and protection coating can be electrophoretically deposited onto a metallic substrate from a solution (or dispersion) containing polynuclear aluminum oxide hydroxide precursors. The resulting protection coating is uniform in thickness and substrate coverage.

Figure 1:
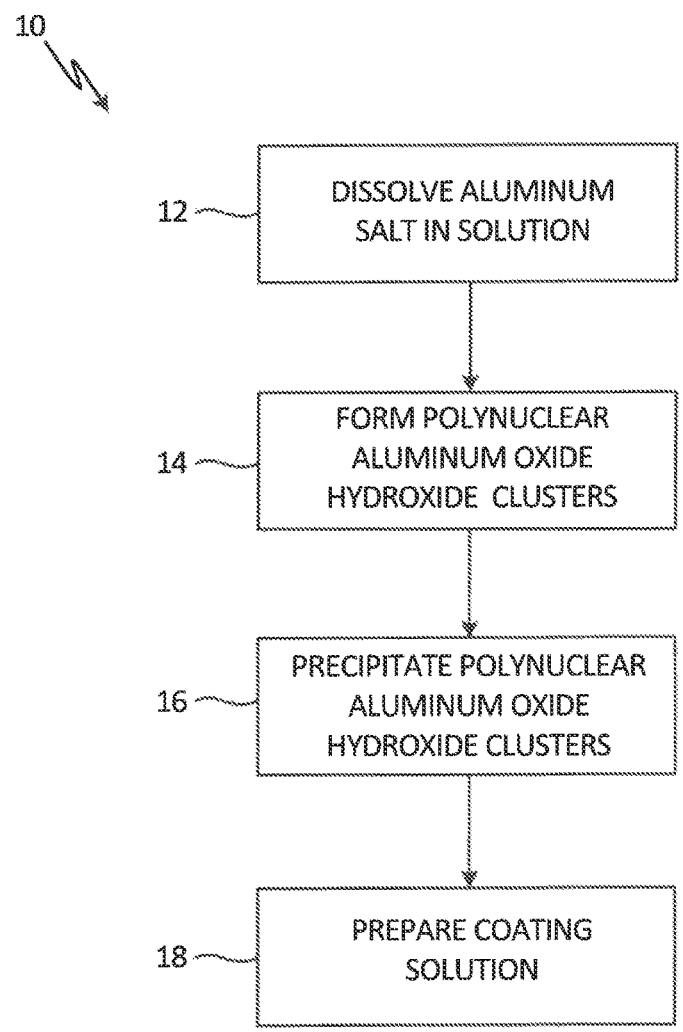
FIG. 1 is a flow chart depicting a method of preparing an aluminum oxide coating solution.

FIG. 1 is a flow chart that depicts method 10 of preparing an aluminum oxide coating solution. First, polynuclear aluminum oxide hydroxide clusters are synthesized. To begin, aluminum salt precursors are dissolved in water at room temperature in step 12. The aluminum salt precursor can be aluminum nitrate, aluminum chloride, aluminum triacetate, aluminum tri-sec-butoxide, or other appropriate salt precursors. Ideally, the resulting aluminum salt solution has a total concentration of aluminum ions ($Al^{3+}$) between 0.02 and 2.00 moles per liter.

Next, in step 14, polynuclear aluminum oxide hydroxide clusters, also referred to as "aluminum Keggin compounds," or "$Al_{13}$" are created by controlled neutralization. In one method, the aluminum salt solution is titrated with a base solution at an elevated temperature (e.g, ~70° C.) until the solution has a mole ratio of hydroxide ions to aluminum ions ($OH^-$:Al) between 2.1 and 2.6, and preferably between 2.2 and 2.4. Ideally, the solution has a resulting pH of between 4 and 7. Standard titration base solutions can be used, including (but not limited to) sodium hydroxide, potassium hydroxide, ammonium hydroxide, sodium bicarbonate, or sodium carbonate. This results in polynuclear aluminum oxide hydroxide clusters that can be used for later coating formulation.

Alternatively, step 14 can be replaced and polynuclear aluminum oxide hydroxide clusters can be synthesized through electrolytic neutralization or electroless reduction of anions and water in an aqueous aluminum salt solution. Other alternatives for polynuclear aluminum oxide hydroxide cluster preparation include using methods similar to those leveraged in water purification techniques, such as aqueous electrolysis using sacrificial aluminum anodes in a mildly acidic (or neutral) solution bath.

The resulting polynuclear aluminum oxide hydroxide clusters have the formula $[AlO_4Al_{12}(OH)_{24}(H_2O)_{12}]^{7+}$. Each cluster has a diameter within the range of 1.0 to 1.8 nanometers, preferably 1.2 nanometers. The synthesized polynuclear aluminum oxide hydroxide clusters form charge-neutralized complexes with multiple counter ions in solution. For example, a polynuclear aluminum oxide hydroxide cluster formed from the neutralization of aluminum nitrate will have a resulting formula of $\{[AlO_4Al_{12}(OH)_{24}(H_2O)_{12}]^{7+\ast} \, 7NO_3^-\}$. When a different salt precursor is used for preparation, those salt anions will form the counter-ions in the resulting polynuclear aluminum oxide hydroxide complex.

The polynuclear aluminum oxide hydroxide clusters can be used directly in creation of an anti-corrosion and protective coating, or can be precipitated, purified, and then re-dissolved prior to the formulation of a liquid coating. Thus, in step 16, the polynuclear aluminum oxide hydroxide clusters are precipitated (via coagulation) out of solution. The resulting colloids are re-suspended in an aqueous solution that can either be acidic, with a pH above 4, or basic, with a pH between 8.5 and 9.5. Alternatively, the resulting colloids can be dissolved into a basic aluminum colloidal suspension (a sol) or can be dispersed in an organic solvent. Solvent options include, but are not limited to, methanol, ethanol, isopropanol, butanol, acetic acid, formic acid, dimethylformamide, ethyl acetate, and tetrahydrofuran.

Alternatively, for step 16, instead of precipitation of polynuclear aluminum oxide hydroxide clusters, the counter-anions on the charge-neutralized polynuclear aluminum oxide hydroxide complexes can be exchanged with anionic ligands. These ligands can be, for example, fluoride ions or carboxylate ions, such that the anionic ligands bind to the polynuclear aluminum oxide hydroxide clusters. Alternatively, polynuclear aluminum oxide hydroxide clusters can exchange counter-anions with alcohols or esters if desired. If this type of exchange is induced, the anionic ligands will bind to an outer coordination sphere of the polynuclear aluminum oxide hydroxide complex.

Finally, in step 18, polynuclear aluminum oxide hydroxide clusters are incorporated into a liquid coating solution (or a dispersion formula) which will ultimately be used to create a coating on a metallic substrate. A coating solution can also contain surfactants, amphiphilic ligands, organic binders, buffer species, co-coagulants, corrosion-inhibitors, chelating agents, rheology modifiers, or monomeric metal ions. These molecules can serve to accelerate coagulation, deposition, and adhesion of the coating to a substrate as desired.

Additionally, co-coagulants, such as salts of metal oxides, can be combined with the polynuclear aluminum oxide hydroxide solution. Specifically, the salts of metal oxides containing silicon, molybdenum, tungsten, vanadium, iron, chromium, zinc, or copper, can be combined with the coating solution, including ammonium salts (such as $(NH_4)_2MoO_4$, $(NH_4)_2WO_4$, or $(NH_4)_3VO_3$) where that the ammonium cation is released as $NH_3$ during application and drying, without leaving residue. If a co-coagulant is added in the form of a salt of a metal oxide, the target aluminum to metal atomic ratio ranges from 1.5 to 15.0. These co-coagulants can facilitate polynuclear aluminum oxide hydroxide cluster self-assembly into three dimensional structures, causing larger crystal sizes to form when the polynuclear aluminum oxide hydroxide clusters precipitate. The co-coagulants may also modify the precipitate crystalline ordering, enhance phase transformation kinetics of the consolidating coating, or act as nucleation agents for crystallization.

Figure 2:
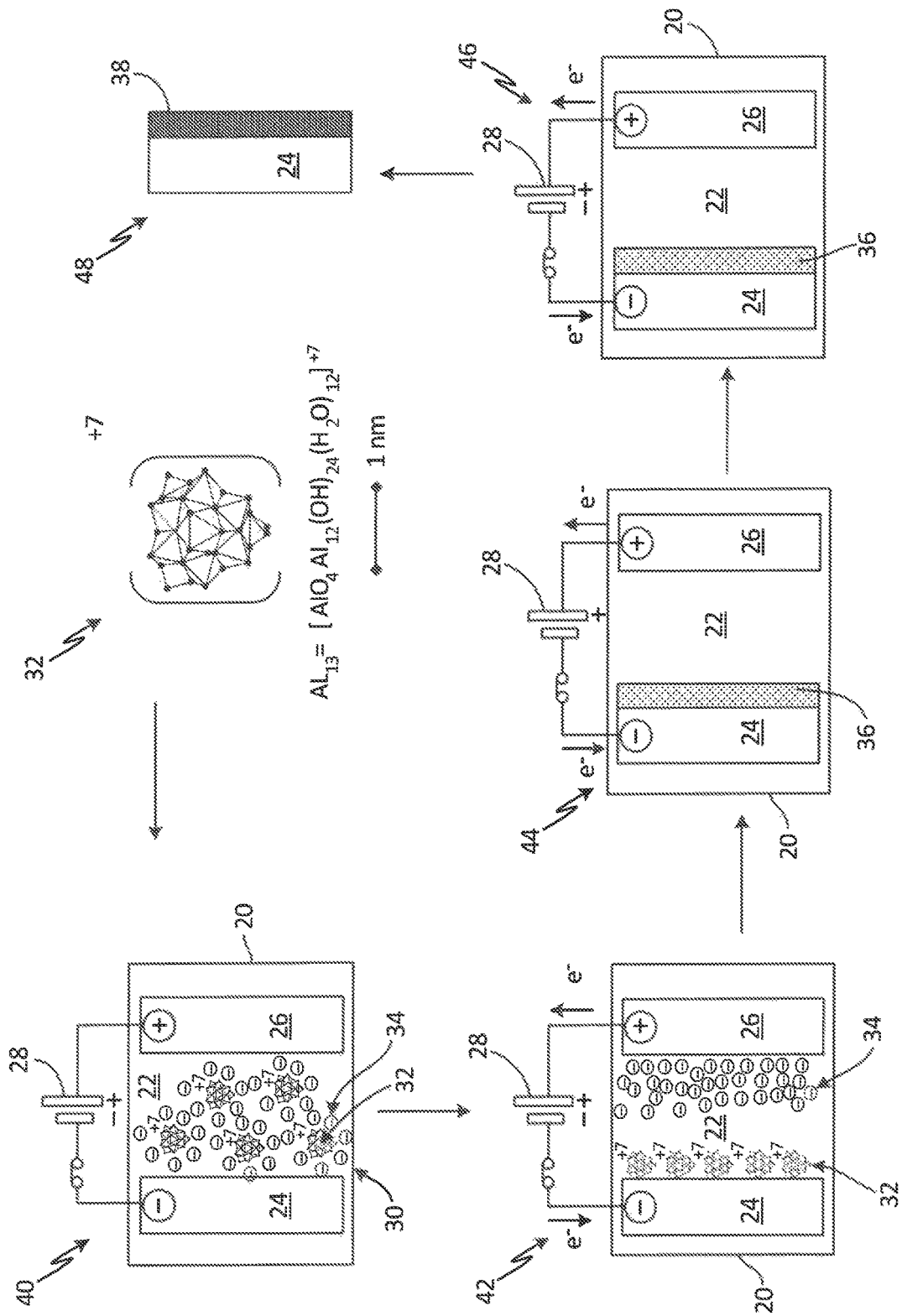
FIG. 2 is a schematic diagram depicting deposition of a protective and anti-corrosion coating on a metallic substrate.

The finalized polynuclear aluminum oxide hydroxide cluster solution can then be applied to a metallic substrate to create an anti-corrosion and protection coating as described in reference to FIG. 2.

FIG. 2 is a schematic diagram depicting a method of deposition of a protective and anti-corrosion coating on a metallic substrate in an electrochemical system. FIG. 2 shows electrochemical system 20 throughout steps 40-48 of creation of a coating with polynuclear aluminum oxide hydroxide clusters. Step 40 shows system 20 at rest. System 20 includes cell 22 with polynuclear aluminum oxide hydroxide cluster solution, the metal substrate cathode 24, anode 26, and power supply 28.

Cell 22 contains polynuclear aluminum oxide hydroxide cluster solution created by method 10 (as described in reference to FIG. 1). Polynuclear aluminum oxide hydroxide clusters are represented in FIG. 2 by complexes 30, which contain both polynuclear aluminum oxide hydroxide clusters 32 and negative counter-anions 34. During electrodeposition, polynuclear aluminum oxide hydroxide clusters 32 will separate from negative counter-anions 34, leaving an aluminum hydroxide coating on cathode 24. This is described in more detail below.

Cathode 24 is also the substrate on which an anti-corrosion and protective coating will be deposited. The substrate may be an anodizable base metal or alloy. For example, aluminum, titanium, zirconium, hafnium, niobium, tantalum, tungsten, magnesium, zinc, iron, or alloys thereof can be used. The substrate can also be a base metal or alloy that is not commonly anodized or cannot form a coherent self-passivation oxide film, such as ferrous alloys.

Cathode 24 may have to be pretreated, degreased, or alkaline cleaned prior to deposition of the anti-corrosion and protection coating to eliminate native oxides or smut. Pre-cleaning can also be accomplished through initial cathodic treatment in acidic or alkaline aqueous solutions. When cathode 24 is in cell 22 and electrodeposition is being run, cathode 24 will have a negative charge.

In contrast, anode 26 is positively-charged when cell 22 is running, and can be made of any suitable material, such as stainless steel, lead, titanium, and aluminum, for the electrodeposition cell. In one embodiment, a power supply 28 applies a voltage of between 1 and 400 volts DC, for example. The voltage drives electrons from the anode to the cathode, causing the cathode and anode to be negatively and positively charged, respectively.

Inside cell 22, cathodic electrodeposition of the polynuclear aluminum oxide hydroxide solution occurs in steps 42-46. In step 42, polynuclear aluminum oxide hydroxide clusters 32 separate from negative counter-anions 34 according to their charges. Alternatively, anodic deposition of high pH colloidal suspensions (sols) of polynuclear aluminum oxide hydroxide clusters is possible, but involves different chemical mechanisms.

After initial cathodic electrodeposition of step 42, neutralization and discharge reactions occur during step 44 in cell 22. At the cathode, the following reactions can occur:

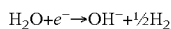

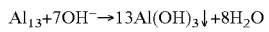

These reactions result in an aluminum hydroxide coating 36 on cathode 24 and resulting water from polynuclear aluminum oxide hydroxide clusters 32. At the anode, the following reactions can occur:

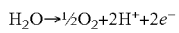

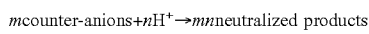

The anode reactions neutralize the counter-anions 34 that previously surrounded each polynuclear aluminum oxide hydroxide cluster 32. Cathodic electrodeposition conducted at high voltage (such as 100-1000 volts, for example) can be used to achieve micro-arc conditions that produce deposits of high density and low water content. The use of this deposition method may simplify or avoid the need for post heat treatment.

Next, in step 46, consolidation of precursor coating 36 on cathode 24 (the substrate) occurs. Precursor coating 36 is the beginning of an anti-corrosion and protective coating on cathode 24 comprised of aluminum hydroxides. At this point, electrodeposition is complete, but remaining solvents, counter-ions, and binders must be removed. Thus, in step 48, cathode 24 and precursor coating 36 are heated to remove unwanted molecules.

Alternatively, the synthesis of the polynuclear aluminum oxide hydroxide clusters and their electrodeposition to form an aluminum oxide coating may occur in one step by conducting simultaneous electrolysis with a sacrificial aluminum anode as in water purification, and the substrate to be coated with aluminum oxide as the cathode.

Heat treatment in step 48 also promotes formation of final aluminum oxide coating 38 and promotes diffusion bonding with the substrate that was coated (cathode 24). Heat treatment conditions should be compatible with prior metal alloy substrate annealing, solution, and precipitation or aging heat treatments applied to achieve specific metallurgical tempers, secondary phase characteristics, or mechanical properties. During heating, precursor coating 36 progressively consolidates as-deposited amorphous aluminum trihydroxide layers (formed from the condensation reactions of polynuclear aluminum oxide hydroxide clusters 32 on cathode 24) into a final aluminum oxide coating 38. The aluminum oxide phases present in the coating depend on the heat treatment conditions used. Increasing heat over temperatures of about 100 to about 500° C. will cause any remaining water, ligands, and non-metallic counter-ions or additives present in the coating to desorb or to decompose. Above 300° C., boehmite or aluminum trihydroxide can transform to a dense transition-alumina phase (including $\chi$-$Al_2O_3$, $\eta$-$Al_2O_3$, or γ-Al$_2$O$_3$). Full alumina nanocrystallite transformation to α-Al$_2$O$_3$ is possible at temperatures above 1000° C.

The final aluminum oxide coating 38 may be applied to components in a single layer or in several layers to build up to the targeted coating thickness. The final aluminum oxide coating 38 thickness typically ranges from 0.005 to 10.00 microns. The final aluminum oxide coating 38 has a multitude of benefits. First, synthesis of polynuclear aluminum oxide hydroxide precursors is low cost and high yield. The solutions are stable and easy to work with. During heat treatment of the final coating, the precursor polynuclear aluminum oxide hydroxide coating consolidates into a dense, cohesive aluminum oxide with high dimensional control. This is a potential replacement for hazardous chromium-based and metal phosphate conversion coatings.

Second, electrodeposition coating methods are highly efficient, reduce energy consumption, and create uniform thickness of coating along uneven surfaces. Coatings created by electrodeposition are defect free, and can have low coefficient of thermal expansion mismatches with metallic substrates. Electrodeposition coatings can even be applied over existing oxide coatings to seal defects or pores on substrates. The process of electrodeposition itself does not produce any heavy metals, sludge or hazardous waste, and thus is environmentally friendly. The process does not require extensive cleaning and preparation steps, and is efficient. Finally, the electrodeposition process can be tailored depending on the coating needs.

Discussion of Possible Embodiments

The following are non-exclusive descriptions of possible embodiments of the present invention.

A method includes electrodepositing polynuclear aluminum oxide hydroxide clusters from a polynuclear aluminum oxide hydroxide cluster solution on a metallic substrate to form a precursor coating, and post-treating the precursor coating to form an aluminum oxide coating on the metallic substrate.

The method of the preceding paragraph can optionally include, additionally and/or alternatively, any one or more of the following features, configurations and/or additional components:

Electrodepositing polynuclear aluminum oxide hydroxide clusters includes filling an electrochemical cell with the polynuclear aluminum oxide hydroxide solution comprising polynuclear aluminum oxide hydroxide clusters and counter-anions, and wherein the electrochemical cell comprises the metallic substrate and an anode; applying a voltage across the electrochemical cell such that the metallic substrate is negative and the anode is positive; electrodepositing a first layer of polynuclear aluminum oxide hydroxide clusters from the polynuclear aluminum oxide hydroxide solution onto the metallic substrate; and consolidating the polynuclear aluminum oxide hydroxide clusters on the metallic substrate.

The method includes electrodepositing a second layer of polynuclear aluminum oxide hydroxide clusters on to the metallic substrate.

The metallic substrate is comprised of a material selected from the group consisting of aluminum, titanium, zirconium, hafnium, niobium, tantalum, tungsten, magnesium, zinc, iron, and alloys thereof.

The method includes synthesizing the polynuclear aluminum oxide hydroxide cluster solution.

Synthesizing the polynuclear aluminum oxide hydroxide cluster solution comprises electrolysis of an aluminum anode in an acidic solution.

Synthesizing the polynuclear aluminum oxide hydroxide cluster solution includes dissolving an aluminum salt into an aqueous solution, forming polynuclear aluminum oxide hydroxide clusters by controlled neutralization, and coagulating the polynuclear aluminum oxide hydroxide clusters.

The aluminum salt is selected from the group consisting of aluminum nitrate, aluminum chloride, aluminum triacetate, and aluminum tri-sec-butoxide.

The method includes re-suspending the polynuclear aluminum oxide hydroxide clusters in aqueous solution or dispersing the polynuclear aluminum oxide hydroxide clusters in an organic solvent.

The method includes creating a sol with the polynuclear aluminum oxide hydroxide clusters.

Forming polynuclear aluminum oxide hydroxide clusters by controlled neutralization is done by titration with a base.

Electrodepositing polynuclear aluminum oxide hydroxide clusters includes cathodic electrodeposition conducted at a voltage between 100 and 1000 volts such that micro-arc conditions form a dense precursor coating.

The polynuclear aluminum oxide hydroxide solution further comprises a surfactant, binder, pH buffer, co-coagulant, corrosion inhibitor, chelating agent, rheology modifier, or monomeric metal ion.

The polynuclear aluminum oxide hydroxide solution further comprises a co-coagulant selected from the group consisting of metal oxide salts containing silicon, molybdenum, tungsten, vanadium, iron, chromium, zinc, or copper, where the metal to aluminum ratio ranges from 1.5 to 15.0.

A protective coating on a metallic substrate includes a dense, cohesive aluminum oxide layer formed from electrodeposited, heat-treated polynuclear aluminum oxide hydroxide clusters.

The protective coating of the preceding paragraph can optionally include, additionally and/or alternatively, any one or more of the following features, configurations and/or additional components:

The first aluminum oxide layer is diffusion bonded to the metallic substrate.

The coating includes a second aluminum oxide layer formed from electrodeposited, heat-treated polynuclear aluminum oxide hydroxide clusters.

The first and second aluminum oxide layers are diffusion bonded to each other.

The precursor coating has a thickness between 0.005 and 10.000 microns.

The aluminum oxide layer comprises amorphous aluminum oxide, pseudo-boehmite, boehmite, bayerite, gibbsite, transition-alumina, α-alumina, or a combination thereof.

The metallic substrate is selected from the group consisting of aluminum, titanium, zirconium, hafnium, niobium, tantalum, tungsten, magnesium, zinc, iron, and alloys thereof.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method comprising:
   electrodepositing polynuclear aluminum oxide hydroxide clusters from a polynuclear aluminum oxide hydroxide cluster solution on a metallic substrate to form a precursor coating; and
   post-treating the precursor coating to form an aluminum oxide coating on the metallic substrate.

2. The method of claim 1, wherein electrodepositing polynuclear aluminum oxide hydroxide clusters comprises:
   filling an electrochemical cell with the polynuclear aluminum oxide hydroxide solution comprising polynuclear aluminum oxide hydroxide clusters and counter-anions, and wherein the electrochemical cell comprises the metallic substrate and an anode;
   applying a voltage across the electrochemical cell such that the metallic substrate is negative and the anode is positive;
   electrodepositing a first layer of polynuclear aluminum oxide hydroxide clusters from the polynuclear aluminum oxide hydroxide solution onto the metallic substrate; and
   consolidating the polynuclear aluminum oxide hydroxide clusters on the metallic substrate.

3. The method of claim 1, further comprising electrodepositing a second layer of polynuclear aluminum oxide hydroxide clusters on to the metallic substrate.

4. The method of claim 1, wherein the metallic substrate is comprised of a material selected from the group consisting of aluminum, titanium, zirconium, hafnium, niobium, tantalum, tungsten, magnesium, zinc, iron, and alloys thereof.

5. The method of claim 1, further comprising synthesizing the polynuclear aluminum oxide hydroxide cluster solution.

6. The method of claim 5, wherein synthesizing the polynuclear aluminum oxide hydroxide cluster solution comprises electrolysis of an aluminum anode in an acidic solution.

7. The method of claim 5, wherein synthesizing the polynuclear aluminum oxide hydroxide cluster solution comprises:
   dissolving an aluminum salt into an aqueous solution;
   forming polynuclear aluminum oxide hydroxide clusters by controlled neutralization; and
   coagulating the polynuclear aluminum oxide hydroxide clusters.

8. The method of claim 7, wherein the aluminum salt is selected from the group consisting of aluminum nitrate, aluminum chloride, aluminum triacetate, and aluminum tri-sec-butoxide.

9. The method of claim 7, further comprising re-suspending the polynuclear aluminum oxide hydroxide clusters in aqueous solution or dispersing the polynuclear aluminum oxide hydroxide clusters in an organic solvent.

10. The method of claim 7, further comprising creating a sol with the polynuclear aluminum oxide hydroxide clusters.

11. The method of claim 7, wherein forming polynuclear aluminum oxide hydroxide clusters by controlled neutralization is done by titration with a base.

12. The method of claim 1, wherein electrodepositing polynuclear aluminum oxide hydroxide clusters comprises cathodic electrodeposition conducted at a voltage between 100 and 1000 volts such that micro-arc conditions form the precursor coating.

13. The method of claim 5, wherein the polynuclear aluminum oxide hydroxide solution further comprises a surfactant, binder, pH buffer, co-coagulant, corrosion inhibitor, chelating agent, rheology modifier, or monomeric metal ion.

14. The method of claim 13, wherein the polynuclear aluminum oxide hydroxide solution further comprises a co-coagulant selected from the group consisting of metal oxide salts containing silicon, molybdenum, tungsten, vanadium, iron, chromium, zinc, or copper, where the metal to aluminum ratio ranges from 1.5 to 15.0.

* * * * *